US011785335B2

(12) United States Patent
Lv et al.

(10) Patent No.: US 11,785,335 B2
(45) Date of Patent: Oct. 10, 2023

(54) AUTOMATIC ADJUSTING PHOTOGRAPHING METHOD AND APPARATUS

(71) Applicant: SAMSUNG ELECTRONICS CO., LTD., Suwon-si (KR)

(72) Inventors: Lu Lv, Nanjing (CN); Suqin Xu, Nanjing (CN); Bin Li, Nanjing (CN); Jianjun Yang, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/687,974

(22) Filed: Mar. 7, 2022

(65) Prior Publication Data

US 2022/0286603 A1 Sep. 8, 2022

Related U.S. Application Data

(63) Continuation of application No. PCT/KR2022/001800, filed on Feb. 7, 2022.

(30) Foreign Application Priority Data

Mar. 4, 2021 (CN) .......................... 202110311334.0
Jun. 17, 2021 (CN) .......................... 202110670035.6

(51) Int. Cl.
*H04N 23/60* (2023.01)
*G06T 7/521* (2017.01)
(Continued)

(52) U.S. Cl.
CPC .......... *H04N 23/64* (2023.01); *G01S 5/0268* (2013.01); *G06T 7/521* (2017.01); *G06T 7/70* (2017.01);
(Continued)

(58) Field of Classification Search
CPC ...... H04N 23/64; H04N 23/62; H04N 23/632; H04N 23/66; H04N 23/671; H04N 23/69;
(Continued)

(56) References Cited

U.S. PATENT DOCUMENTS 10,397,484 B2 8/2019 Keskin et al.
2002/0049728 A1* 4/2002 Kaku ................... G11B 27/034
(Continued)

FOREIGN PATENT DOCUMENTS

CN 105007432 A 10/2015
CN 105204270 A 12/2015
(Continued)

OTHER PUBLICATIONS

Communication dated Jul. 4, 2022, issued by the China National Intellectual Property Administration (CNIPA) of P.R. China in counterpart Chinese Application No. 202110670035.6.
(Continued)

*Primary Examiner* — Usman A Khan
(74) *Attorney, Agent, or Firm* — Sughrue Mion, PLLC

(57) ABSTRACT

A photographing method and apparatus are provided. The photographing method includes: identifying a photographing distance and a photographing angle with respect to the external device based on timings of signals transmitted and received through a communication connection; acquiring a scene image based on an output of a camera of the photographing device; identifying a current composition model based on the photographing distance, the photographing angle and the scene image; acquiring a set of photographing parameters that are associated with the current composition model; identifying a focal length based on the photographing distance and the current composition model; displaying a preview image based on the output of the camera, the photographing parameter and the current composition
(Continued)

model; outputting the preview image as a photographing result based on a photographing instruction; and updating the set of photographing parameters based on the photographing parameter.

20 Claims, 9 Drawing Sheets

(51) Int. Cl.
  *G06T 7/70* (2017.01)
  *G06V 20/00* (2022.01)
  *G01S 5/02* (2010.01)
  *H04N 23/62* (2023.01)
  *H04N 23/66* (2023.01)
  *H04N 23/63* (2023.01)
  *H04N 23/67* (2023.01)
(52) U.S. Cl.
  CPC ............ *G06V 20/35* (2022.01); *H04N 23/62* (2023.01); *H04N 23/632* (2023.01); *H04N 23/66* (2023.01); *H04N 23/671* (2023.01); *G06T 2200/24* (2013.01); *G06T 2207/10028* (2013.01); *G06T 2207/30244* (2013.01)
(58) Field of Classification Search
  CPC ...... G01S 5/0268; G01S 13/0209; G01S 5/06; G01S 11/04; G01S 13/74; G06T 7/521; G06T 7/70; G06T 2200/24; G06T 2207/10028; G06T 2207/30244; G06V 20/35
  USPC ...................................................... 348/207.1
  See application file for complete search history.

(56) References Cited

U.S. PATENT DOCUMENTS

| | | | |
|---|---|---|---|
| 2004/0239777 A1* | 12/2004 | Nakamura | H04N 1/00143 348/239 |
| 2008/0220732 A1* | 9/2008 | Ikramov | A61B 5/0507 455/114.3 |
| 2016/0150196 A1 | 5/2016 | Horvath | |
| 2017/0123041 A1 | 5/2017 | Bae et al. | |
| 2017/0356980 A1 | 12/2017 | Islam et al. | |
| 2018/0352166 A1 | 12/2018 | Silic | |
| 2021/0003685 A1 | 1/2021 | Hong et al. | |

FOREIGN PATENT DOCUMENTS

| | | | | |
|---|---|---|---|---|
| CN | 106448237 A | | 2/2017 | |
| CN | 107920211 A | | 4/2018 | |
| CN | 108289169 A | | 7/2018 | |
| CN | 108521860 A | * | 9/2018 | |
| CN | 108521860 A | | 9/2018 | |
| CN | 108683847 A | * | 10/2018 | ............ H04N 5/232 |
| CN | 108683847 A | | 10/2018 | |
| CN | 111935393 A | | 11/2020 | |
| EP | 3667365 A1 | | 6/2020 | |
| KR | 10-2019-0069268 A | | 6/2019 | |
| WO | 2018/093002 A1 | | 5/2018 | |
| WO | 2018169509 A1 | | 9/2018 | |
| WO | 2020/114595 A1 | | 6/2020 | |

OTHER PUBLICATIONS

Communication dated May 10, 2022, issued by the International Searching Authority in counterpart International Application No. PCT/KR2022/001800 (PCT/ISA/220, 210, 237).

* cited by examiner

AUTOMATIC ADJUSTING PHOTOGRAPHING METHOD AND APPARATUS

CROSS-REFERENCE TO RELATED APPLICATIONS

This application is a bypass continuation of PCT International Application No. PCT/KR2022/001800, filed on Feb. 7, 2022, which is based on and claims priority to Chinese Patent Application No. 202110311334.0, filed on Mar. 24, 2021, and Chinese Patent Application No. 202110670035.6, filed on Jun. 17, 2021, the disclosures of which are incorporated by reference herein in their entireties.

TECHNICAL FIELD

The disclosure relates to a photographing method and apparatus.

BACKGROUND ART

People have become accustomed to recording life moments, for example by capturing photographs. In current photography solutions, a focal length may be adjusted automatically based on system parameters or through manual (i.e., user) adjustment. However, automatic adjustment is limited to static objects, and the manual adjustment is time-consuming and inconvenient.

SUMMARY OF THE INVENTION

Provided are a photographing method and an electronic device for photographing.

According to an aspect of the disclosure, a method performed by a photographing device, includes: establishing a communication connection with an external device associated with a photographing target; identifying a photographing distance and a photographing angle with respect to the external device based on timings of signals transmitted and received through the communication connection; acquiring a scene image based on an output of a camera of the photographing device; identifying a current composition model based on the photographing distance, the photographing angle and the scene image; acquiring a set of photographing parameters that are associated with the current composition model; identifying a photographing parameter based on the set of photographing parameters and the photographing distance, wherein the photographing parameter includes a focal length; generating and displaying a preview image based on the output of the camera, the photographing parameter and the current composition model; outputting the preview image as a photographing result based on a photographing instruction; and updating the set of photographing parameters based on the photographing parameter.

The identifying the photographing distance and the photographing angle may include: identifying a first distance between a first antenna of the photographing device and the external device; identifying a second distance between a second antenna of the photographing device and the external device; identifying a third distance between a third antenna of the photographing device and the external device; determining coordinates P of the external device in a three-dimensional coordinate system based on first coordinates of the first antenna, second coordinates of the second antenna, third coordinates of the third antenna, the first distance, the second distance and the third distance, wherein an origin of the three-dimensional coordinate system is a circumcenter of a polygon, and vertexes of the polygon correspond to the first antenna, the second antenna and the third antenna; identifying an angle of a connecting line between the origin and the coordinates P with respect to a plane in which the polygon exists, to obtain the photographing angle; and identifying the photographing distance based on a distance d between the origin and the coordinates P.

The identifying the photographing distance may include identifying the photographing distance D according to $D=\Delta d+d$. $\Delta d$ represents a displacement of the photographing device from an initial position, $\Delta d$ is less than 0 when the displacement is a forward displacement and is greater than 0 when the displacement is a backward displacement.

The identifying the photographing distance may include: identifying the photographing device is currently displaced forward or backward from an initial position; identifying the distance d as the photographing distance D based on identifying the photographing device is not currently displaced forward or backward; identifying whether a user-preferred photographing displacement is currently saved; identifying the photographing distance D according to $D=\Delta d'+d$, with $\Delta d'$ representing the user-preferred photographing displacement based on the user-preferred photographing displacement being currently saved; identifying the photographing distance D according to $D=\Delta d+d$, with $\Delta d$ representing a displacement of the photographing device from the initial position; and saving the $\Delta d$ as the user-preferred photographing displacement $\Delta d'$. $\Delta d$ is less than 0 when the displacement is a forward displacement and is greater than 0 when the displacement is a backward displacement.

The identifying the photographing distance and the photographing angle may include: identifying a mean distance and a mean angle based on a plurality of distances d and a plurality of angles $\alpha$ between the photographing device and the external device, which are currently measured for N times; identifying the mean distance as the photographing distance and the mean angle as the photographing angle based on an absolute value of a difference between each of the plurality of distances d and the mean distance being less than a preset distance threshold T; and repeating the identifying the mean distance and the mean angle based on the absolute value of the difference between any of the plurality of distances d and the mean distance being greater than or equal to the preset distance threshold T. Measuring the plurality of distances d and the plurality of angles $\alpha$ may include: identifying a first distance between a first antenna of the photographing device and the external device; identifying a second distance between a second antenna of the photographing device and the external device; identifying a third distance between a third antenna of the photographing device and the external device; determining coordinates P of the external device in a three-dimensional coordinate system based on first coordinates of the first antenna, second coordinates of the second antenna, third coordinates of the third antenna, the first distance, the second distance and the third distance, wherein an origin of the three-dimensional coordinate system is a circumcenter of a polygon, and vertexes of the polygon correspond to the first antenna, the second antenna and the third antenna; identifying an angle of a connecting line between the origin and the coordinates P with respect to a plane in which the polygon exists, to obtain each of the angles $\alpha$; and identifying each of the distances d based on coordinates corresponding to the origin and the coordinates P.

The identifying the current composition model may include: identifying a position of the photographing target in the preview image based on the photographing distance and the photographing angle; identifying a scene type based on the scene image; and identifying a composition model that corresponds to the position and the scene type as the current composition model.

The method may further include: after generating the preview image, determining whether the position of the photographing target in the preview image corresponds to a target capturing position of the current composition model; and outputting the preview image as the photographing result based on the position of the photographing target in the preview image corresponding to the target capturing position.

The identifying the current composition model may include selecting a default composition model corresponding to the scene image as the current composition model, and the method may further include: identifying a device adjustment; outputting a notification to move the photographing device based on the device adjustment; and providing a notification indicating it is currently possible to obtain photos with the default composition during a movement procedure based on the current composition model being identified.

The identifying the device adjustment may include: selecting, from a target candidate position set matching the scene image, a first target candidate position based on a position of the photographing target in the preview image, wherein the target candidate position set includes a plurality of target candidate positions matching a scene type corresponding to the scene image; and identifying the device adjustment by identifying the first target candidate position as a target position of the photographing target in the preview image.

The method may further include: identifying a user-set photographing parameter based on the acquiring the set of photographing parameters failing; and adding the user-set photographing parameter to the set of photographing parameters associated with the current composition model.

The generating the preview image may include: generating a first image based on the photographing parameter and the current composition model; identifying whether a scale of the photographing target in the first image is within a preset scale range; based on the scale of the photographing target not being within the preset scale range, adjusting the focal length in the photographing parameter in order to make the scale of the photographing target be within the preset scale range; and identifying a second image obtained based on the adjusted focal length as the preview image.

The method may further include: identifying an updated photographing parameter; and generating and displaying an updated preview image based on the updated photographing parameter and the current composition model.

The method may further include: identifying that the photographing distance or the photographing angle changes to an updated photographing distance or an updated photographing angle; identifying an updated composition model based on the updated photographing distance and the updated photographing angle and the scene image; acquiring an updated set of user-preferred photographing parameters matched with the updated composition model; identifying an updated photographing parameter based on the updated set of user-preferred photographing parameters and the photographing distance; and generating and displaying an updated preview image based on the updated photographing parameter and the updated composition model.

According to an aspect of the disclosure, a photographing apparatus includes: a communication interface; a camera; a display; and a processor configured to: establish a communication connection with an external device associated with a photographing target; identifying a photographing distance and a photographing angle with respect to the external device based on timings of signals transmitted and received through the communication interface; acquire a scene image based on an output of the camera; identify a current composition model based on the photographing distance, the photographing angle and the scene image; acquire a set of photographing parameters that are associated with the current composition model; identify a photographing parameter based on the set of photographing parameters and the photographing distance, wherein the photographing parameter includes a focal length; control the display to display a preview image based on the output of the camera, the photographing parameter and the current composition model; output the preview image as a photographing result based on a photographing instruction; and update the set of photographing parameters based on the photographing parameter.

The photographing apparatus may further include a memory configured to store at least one application to be executed by the processor.

The processor may be further configured to: control the communication interface to transmit a request signal to the external device and receive a response signal from the external device; and identify the photographing distance based on a transmission time corresponding to transmission of the request signal and a reception time corresponding to reception of the response signal.

The communication interface may include a first antenna, a second antenna and a third antenna, and the processor may be further configured to: control the communication interface to transmit a first request signal to the external device through the first antenna at a first transmission time, receive a first response signal from the external device through the first antenna at a first reception time, transmit a second request signal to the external device through the second antenna at a second transmission time, receive a second response signal from the external device through the second antenna at a second reception time, transmit a third request signal to the external device through the third antenna at a third transmission time, and receive a third response signal from the external device through the third antenna at a third reception time; and identify the photographing distance and the photographing angle based on the first transmission time, the first reception time, the second transmission time, the second reception time, the third transmission time and the third reception time.

The communication interface may include an ultra-wide band (UWB) communication interface.

According to an aspect of the disclosure, a non-transitory computer-readable storage medium stores instructions that, when executed by a processor, cause the processor to control a photographing device to perform a photographing method including: establishing a communication connection with an external device associated with a photographing target; identifying a photographing distance and a photographing angle with respect to the external device based on timings of signals transmitted and received through the communication connection; acquiring a scene image based on an output of a camera of the photographing device; identifying a current composition model based on the photographing distance, the photographing angle and the scene image; acquiring a set of photographing parameters that are associated with the current composition model; identifying a photographing parameter based on the set of photographing parameters and the photographing distance, wherein the photographing parameter includes a focal length; generating and displaying a preview image based on the output of the camera, the photographing parameter and the current composition model; outputting the preview image as a photographing result based on a photographing instruction; and updating the set of photographing parameters based on the photographing parameter.

According to an aspect of the disclosure, an apparatus includes: a communication interface; a camera; a display; and a processor configured to: identify a photographing distance based on timings of signals communicated with an external device through the communication interface; and control a focal length of the camera based on the photographing distance.

The processor may be further configured to: control the communication interface to transmit a request signal to the external device and receive a response signal from the external device; and identify the photographing distance based on a transmission time corresponding to transmission of the request signal and a reception time corresponding to reception of the response signal.

The communication interface may include a first antenna, a second antenna and a third antenna, and the processor may be further configured to: control the communication interface to transmit a first request signal to the external device through the first antenna at a first transmission time, receive a first response signal from the external device through the first antenna at a first reception time, transmit a second request signal to the external device through the second antenna at a second transmission time, receive a second response signal from the external device through the second antenna at a second reception time, transmit a third request signal to the external device through the third antenna at a third transmission time, and receive a third response signal from the external device through the third antenna at a third reception time; and identify the photographing distance based on the first transmission time, the first reception time, the second transmission time, the second reception time, the third transmission time and the third reception time.

The apparatus may further include a memory configured to store a first focal length associated with a first composition model and a second focal length associated with a second composition model, and the processor may be further configured to: identify a current composition model, from among the first composition model and the second composition model, based on an output of the camera; set the focal length of the camera to the first focal length based on the current composition model being identified as the first composition model; and set the focal length of the camera to the second focal length based on the current composition model being identified as the second composition model.

The apparatus may further include an accelerometer configured to identify a displacement corresponding to motion of the apparatus from an initial location, and the processor may be further configured to control the focal length of the camera based on the photographing distance and the displacement.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Figure 1:
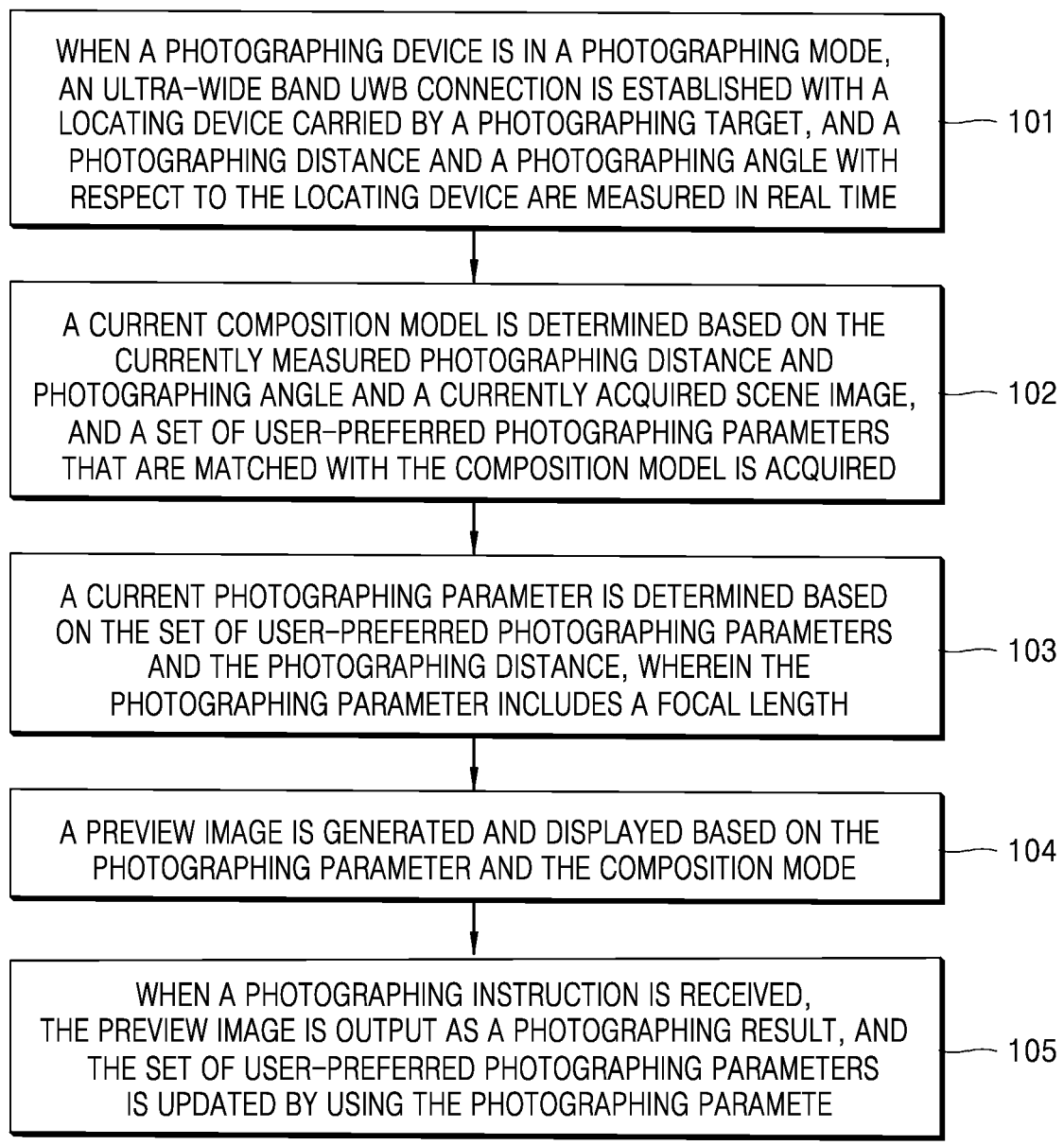
FIG. 1 is a schematic flowchart of a method according to an embodiment.

Embodiments will now be described in with reference to the accompanying drawings. The disclosure may, however, be embodied in many different forms and should not be construed as being limited to the examples set forth herein.

Throughout the disclosure, expressions such as "at least one of," when preceding a list of elements, modify the entire list of elements and do not modify the individual elements of the list. For example, the expression, "at least one of a, b or c" should be understood as including only a, only b, only c, both a and b, both a and c, both b and c, or all of a, b, and c. As used herein, the terms "1st" or "first" and "2nd" or "second" may use corresponding component regardless of importance or order and are used to distinguish a component from another without limiting the components.

An electronic device, according to embodiments of the present disclosure, can include a personal computer (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality headset, a portable game console, a camera, and a wearable device, among others. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device.

Wireless signals can be used for localization of an electronic device. Localization is the ability to determine a location of another electronic device. Wireless signals using Global Positioning System (GPS) can be used for outdoor localization. However, GPS may not provide accurate results for indoor settings. Examples of indoor localization can be based on Wi-Fi signals, BLUETOOTH signals, Ultra-Wideband (UWB) signals, and the like.

In certain embodiments, an electronic device can include a transmitter and a receiver (or a transceiver) and one or more target devices can include a transmitter and receiver (or a transceiver). The receiver (or transceiver) can be ultra-wideband (UWB) receiver (or UWB transceiver). Similarly, the transmitter (or transceiver) can be a UWB transmitter (or UWB transceiver). The electronic device can measure angle of arrival (AoA) of a UWB signal transmitted by the target device. The electronic device can also measure the distance between the two devices based on UWB signals.

UWB signals can provide centimeter level ranging. For example, if the target device is within line of sight (LoS) of the electronic device, the electronic device can determine the range (distance) between the two devices with an accuracy that is within ten centimeters. Alternatively if the target device is not within a LoS of the electronic device, the electronic device can determine the range (distance) between the two devices with an accuracy that is within fifty centimeters. Additionally, if the target device is within LoS of the electronic device, the electronic device can determine the AoA between the two devices with an accuracy that is within three degrees.

FIG. 1 is a schematic flowchart of a photographing method according to an embodiment.

In operation 101, when a photographing device is in a photographing mode, an ultra-wide band (UWB) connection is established with a locating device carried by a photographing target, and a photographing distance and a photographing angle with respect to the locating device are measured in real time. The photographing mode indicates the photographing device is ready to capture or obtain an image data or a video data from the photographic target.

Figure 2:
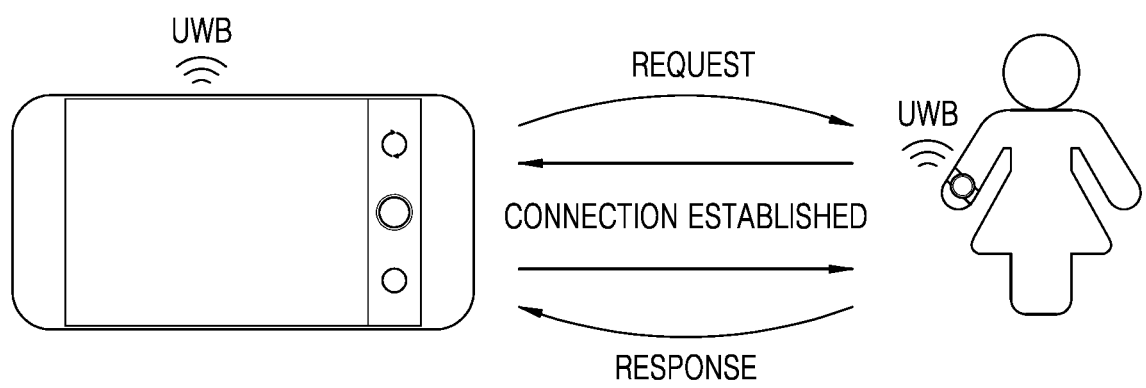
FIG. 2 is a schematic diagram showing an UWB connection established between a photographing device and a locating device carried by a photographing target according to an embodiment.

In this operation, to ensure the accuracy in photographing the photographing target, the photographing device needs to be connected to the locating device carried by the photographing target (as shown in FIG. 2). To establish the UWB connection, the photographing device needs to be provided with an UWB chip, and the locating device also needs to be provided with an UWB chip.

FIG. 2 is a schematic diagram showing an UWB connection established between a photographing device and a locating device carried by a photographing target according to an embodiment. As shown in FIG. 2, the photographing device transmits a request which is received by the locating device. A connection between the photographing device and the locating device is then established, and a response is transmitted from the locating device and received by the photographing device.

In addition, in this operation, the photographing distance and angle with respect to the locating device are measured in real time, for example through UWB ranging. The UWB ranging may be utilized to improve the accuracy of a measurement result, thereby increasing the accuracy in setting the photographing parameter.

Specifically, the photographing device may be a smart phone, a smart camera or other device including an UWB chip and photographing function. The photographing device may include any type of electronic devices which can capture or obtain an (still) image data or a video data from the photographic target.

The locating device may be a smart device having the UWB chip, such as a mobile phone, watch or locater having an UWB chip.

In an implementation, when the photographing device is in a photographing mode, the photographing distance and the photographing angle with respect to the locating device may be measured with a method including the following operations.

In operation a1, a distance between each UWB chip antenna of the photographing device and the locating device (e.g., an UWB chip antenna of the locating device) is determined. For example, the photographing device may include at least three UWB chip antennas and at least three corresponding distances may be determined.

Specifically, for each UWB chip antenna of the photographing device, a distance between the antenna and the locating device may be calculated by using a method for ranging based on a time difference of arrival. Using UWB, the round-trip time of a signal sent between two devices are measured with the precision in the order of nanoseconds, then the range values between the two devices can be determined, since the speed is known.

Figure 3:
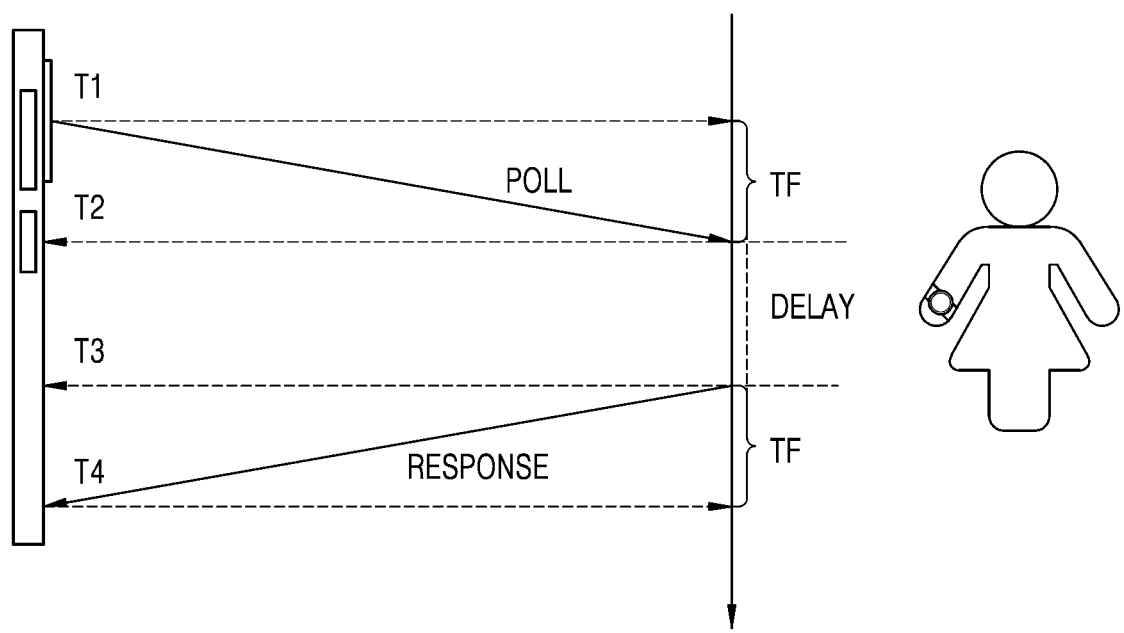
FIG. 3 is a schematic diagram showing measurement of a distance between antennas of the photographing device and the locating device according to an embodiment.

FIG. 3 is a schematic diagram showing measurement of a distance between antennas of the photographing device and the locating device according to an embodiment.

As shown in FIG. 3, a time T1 represents the time when an UWB chip antenna i of the photographing device sends a data packet; a time T2 represents the time when an UWB chip antenna of the locating device receives the data packet; a time T3 represents the time when the locating device sends a reply data packet; and a time T4 represents the time when the antenna i of the photographing device receives the reply data packet. For example, information regarding the time T2 and the time T3 may be enclosed with the reply data packet. Here, a distance $d_i$ from the antenna i to the locating device of the photographing target may be calculated with the following formula:

$$d_i = \frac{((T_4 - T_3) + (T_2 - T_1))}{2} \times C,$$

wherein C represents a wave velocity.

i represents the number of each UWB chip antenna of the photographing device.

As another example, the delay time DT from the time T2 to the time T3 may be known in advance, and the distance $d_i$ from the antenna i to the locating device of the photographing target may be calculated with the following formula:

$$d_i = (T_4 - T_1 - DT) \times C.$$

In operation a2, coordinates P of the locating device are determined based on coordinates of each of the UWB chip antennas in a preset three-dimensional coordinate system and the distance, wherein an origin of the three-dimensional coordinate system is a circumcenter of a preset polygon, and vertexes of the polygon consist of coordinate points correspond to the UWB chip antennas of the photographing device.

For the convenience, axes x and y of the three-dimensional coordinate system are located in a plane where the polygon exists, and an axis z is perpendicular to the plane.

Figure 4:
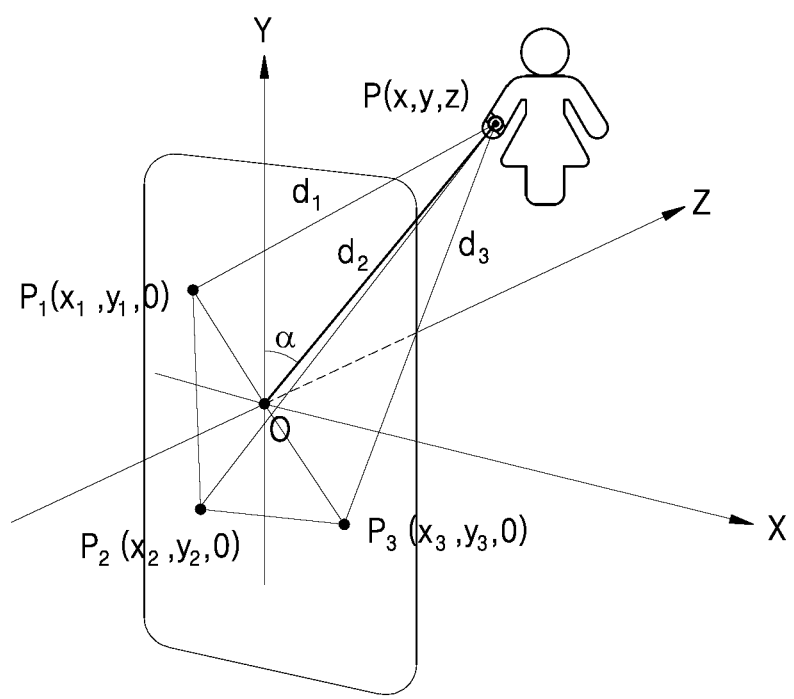
FIG. 4 is a schematic diagram of coordinates of the locating device according to an embodiment.

FIG. 4 is a schematic diagram of coordinates of the locating device according to an embodiment.

As shown in FIG. 4, the photographing device has three UWB chip antennas, and therefore three coordinate points $P_1$, $P_2$ and $P_3$ corresponding to the three antennas may be connected to obtain a polygon, i.e., a triangle, wherein the circumcenter of the triangle acts as an origin O of coordinates, and here, $OP_1 = OP_2 = OP_3$.

Given that the coordinate points $P_1$, $P_2$ and $P_3$ have the following coordinates: $P_1(x_1, y_1, 0)$, $P_2(x_2, y_2, 0)$, $P_3(x_3, y_3, 0)$, and distances between the three UWB chip antennas and the locating device are $d_1$, $d_2$ and $d_3$ respectively, the coordinates P (x, y, z) of the locating device may be solved according to $$\begin{cases} \sqrt{(x-x_1)^2 + (y-y_1)^2 + (z-0)^2} = d_1 \\ \sqrt{(x-x_2)^2 + (y-y_2)^2 + (z-0)^2} = d_2 \\ \sqrt{(x-x_3)^2 + (y-y_3)^2 + (z-0)^2} = d_3 \end{cases}$$

In operation a3, an angle of a connecting line between the origin of coordinates and the coordinates P with respect to a plane in which the polygon exists is calculated to obtain the photographing angle.

As shown in FIG. 4, the photographing device has three UWB chip antennas, and therefore the angle may be calculated according to the following formula:

$$\cos a = \frac{\overrightarrow{OP} \cdot \overrightarrow{OY}}{|\overrightarrow{OP}||\overrightarrow{OY}|} = \frac{x \times 0 + y \times 1 + z \times 0}{\sqrt{x^2 + y^2 + z^2} \times \sqrt{0^2 + 1^2 + 0^2}},$$

wherein the vector coordinates in the axis Y are (0, 1, 0), the point O is (0, 0, 0), and α represents the angle between $\overrightarrow{OP}$ and $\overrightarrow{OY}$.

In operation a4, the photographing distance is calculated based on a distance d between the origin of coordinates and the coordinates P.

Considering that the photographing device may be displaced from the locating device during photographing in actual application, for example, as an arm or body holding the photographing device moves back and forth, the distance may change. In this regard, the measured distance may be tuned during photographing to improve the accuracy in subsequently determining the focal length based on the photographing distance, so as to obtain the photographing distance for determining the focal length.

In an implementation, in operation a4, the photographing distance may be calculated based on the distance d between the origin of coordinates and the coordinates P by using a method including the following operations:

Whether the photographing device is currently displaced forward or backward in a horizontal direction is determined. If the photographing device is currently displaced, the photographing distance D is calculated according to D=Δd+d; otherwise, the distance d is taken as the photographing distance D.

In this regard, Δd represents a displacement, i.e., a forward or backward displacement occurring to the photographing device after operation a1 is executed.

A photographer holding the photographing device is taken as a reference for "forward" and "backward". For example, when the photographer moves the photographing device in a direction away from the photographer, i.e, the photographer moves the camera toward the target direction, the difference of the photographing device is defined as a forward displacement. Oppositely, when the photographer moves the camera in a direction closer to the photographer, that is, when the photographer moves the camera toward the photographer, the difference of the photographing device is defined as a backward displacement.

When the displacement is the forward displacement, the distance between the photographing device and the photographing target is reduced, therefore, Δd is less than 0. When the displacement is the backward displacement, the distance between the photographing device and the photographing target is increased, therefore, Δd is greater than 0 here.

Further, to improve the calculation efficiency, the photographing distance may be determined based on a regular photographing displacement of the user in the method above. The regular photographing displacement of the user may be measured using an acceleration transducer included in the photographing device. For example, it is assumed that an acceleration a, and initial speed V of the photographing device is zero before displacement. The acceleration a can be obtained using transducer included in the photographing device. Then the regular photographing displacement Δd during a time t can be determined according to the following formula:

$$\Delta d = V * t \pm \frac{1}{2}at^2$$
$$= \pm \frac{1}{2}at^2$$

In case of the backward displacement, the regular photographing displacement Δd is (+½at²), and in case of the forward displacement, the regular photographing displacement Δd is (−½at²). Considering the regular photographing displacement Δd, the actual distance can be determined as (d+Δd)

It is unnecessary to calculate all the displacement of the photographing device every time when the movement of the user is detected. Specifically, in another implementation of operation a4, the photographing distance may be calculated based on the distance d between the origin of coordinates and the coordinates P by using a method including the following operations.

In operation w1, it may be determined whether the photographing device is currently displaced forward or backward in a horizontal direction. If the photographing device is currently displaced, operation w2 is executed; otherwise, the distance d may be used as the photographing distance D.

In operation w2, when the photographing device is currently displaced, it may be determined whether a user-preferred photographing displacement is currently saved. If the user-preferred photographing displacement is currently saved, the photographing distance D is calculated according to D=Δd'+d, with Δd representing the user-preferred photographing displacement; otherwise, the photographing distance D is calculated according to D=Δd+d, and Δd is saved as the user-preferred photographing displacement Δd'.

Δd represents a displacement occurring currently, and Δd is less than 0 when the displacement is a forward displacement and greater than 0 when the displacement is a backward displacement.

In an implementation, to improve the accuracy of the photographing distance and photographing angle as determined in operation 101, when the photographing device is in a video photographing mode, the photographing distance and the photographing angle with respect to the locating device may be measured with a method including the following operations.

In operation b1, a distance d and an angle α between the photographing device and the locating device are measured for N times in the UWB ranging manner according to a preset measurement period.

Here, considering that it is in the process of video recording, multiple measurements need to be performed continuously to increase the accuracy in measurement, and the current photographing distance and angle may be determined based on the results from multiple measurements.

Specifically, those skilled in the art may set N and the measurement period as actually needed. For example, considering that 60 frames per second may be reached for video photographing, one frame requires 16.6 milliseconds (msec). The time for one UWB measurement is between 5 msec and 10 msec, and 10 frames may be selected as a group to detect 10 UWB distances. That is, N may be set to 10, and the measurement period may be 16.6 msec. Preferably, the value range of N may be, but is not limited to, $2 \leq N \leq 60$.

In some embodiments, the method for measuring the distance d and the angle α in operation b1 is implemented with the following operations.

In operation x1, a distance between each UWB chip antenna of the photographing device and the locating device is determined, wherein the photographing device includes at least three UWB chip antennas.

As the specific implementation of this operation is substantially similar to that of operation a1, the details will not be repeated.

In operation x2, coordinates P of the locating device are determined based on coordinates of each of the UWB chip antennas in a preset three-dimensional coordinate system and the distance with respect to the locating device, wherein an origin of the three-dimensional coordinate system is a circumcenter of a preset polygon, and vertexes of the polygon consist of coordinate points corresponding to the UWB chip antennas of the photographing device.

As the specific implementation of this operation is substantially similar to that of operation a2, the details will not be repeated.

In operation x3, an angle of a connecting line between the origin of coordinates and the coordinates P with respect to a plane in which the polygon exists is calculated to obtain the angle α.

As the specific implementation of this operation is substantially similar to that of operation a3, the details will not be repeated.

In operation x4, a distance between the origin of coordinates and the coordinates P is calculated to obtain the distance d.

In operation b2, a corresponding mean distance and a corresponding mean angle are calculated based on the distances d and the angles α, which are measured N times.

In operation b3, whether an absolute value of a difference between each of the distances d, which are currently measured for N times, and the mean distance d', is less than a preset distance threshold T is determined. If the absolute value |d'−d| of each of the differences is less than the preset distance threshold T, the mean distance d' is taken as the photographing distance, and the mean angle is taken as the photographing angle; otherwise, i.e. in case of the absolute value |d'−d| is not less than the preset distance threshold T, the method returns to operation b1 and the photographing distance is measured again.

Here, if the absolute value of a difference between a measured distance d and the mean distance d' is greater than or equal to the distance threshold T, it indicates a great variation in difference, and to improve the accuracy, it is necessary to go back to operation b1 for re-measurement of the photographing distance.

The value of the distance threshold T may be appropriately set by those skilled in the art according to actual needs. For example, considering that a walking distance is approximately 65 cm, T may be set to 0.65 m. According to some embodiments, the distance threshold T may be adjusted based on a user adjustable setting.

In operation 102, a current composition model is determined based on the currently measured photographing distance and photographing angle and a currently acquired scene image. Based on the current composition model, a set of user-preferred photographing parameters matched with the current composition model may be acquired. For example, the photographing parameters used when the user photographs the target in the current composition model may indicate the user-preferred photographing parameters in the current composition model, and these photographing parameters can be used later when the picture or the video are taken in same or similar photographing circumstance including the photographing distance, the photographing angle, the scene type, and the composition model.

In an implementation, to improve the accuracy of the determined composition model, the current composition model may be determined specifically by using the following method:

In operation c1, the photographing device determines a position of the photographing target in a preview image based on the currently measured photographing distance and angle, and identifies a photographing scene type based on a currently acquired scene image.

The photographing scene types may specifically include, but are not limited to, single photo, group photo, people and landscape mix, humanities construction and the like.

In operation c2, a composition model matched with the position of the photographing target and the photographing scene type is taken as the current composition model.

The composition model refers to the way the various elements or target in a scene are arranged within the frame. In a practical application, those skilled in the art or users may, according to actual needs, provide a composition model that is matched with each photographing scene type, and with each different position of a photographing target. As such, in this operation, the matched composition model may be determined based on the current photographing scene type and the position of the photographing target in an image.

The composition model may specifically be, but is not limited to, a seven-part composition, a diagonal composition, a symmetric composition, a triangular composition, an L-type composition, a centric composition, a horizontal-line composition, a three-part composition or the like. For example, in diagonal composition, the elements (targets) in the image are organized based on a diagonal line. Such a diagonal composition can emphasize perspective, give the image a sense of depth, and also add dynamism. In triangle composition, the target or scene is arranged to draw attention to an area of focus within a subtle triangle shape. In a symmetrical composition, the two halves of the image are mirror images of each other. In the centric composition, the target is placed in the middle of the image frame. L-type composition is more complex mixture of several shapes. It is most obvious when a part of the photographing scene is very plain and doesn't display that much subject matter. In the horizontal-line composition, the target is placed in the horizontal line of the image frame.

Further, considering that the photographing behavior of a user may not be stored in a photographing device when the user initially uses the photographing device, user-set photographing parameters may be identified in this case and stored for improving the intelligence in subsequent photographing. Specifically, this goal may be achieved with the following method:

In an implementation, if the acquiring of the set of user-preferred photographing parameters in operation 102 fails, the photographing device identifies a current user-set photographing parameter, and the user-set photographing parameter is added to the set of user-preferred photographing parameters as a new photographing parameter matched with the current composition model.

Furthermore, in a practical photographing procedure there may be no composition model matching with the position of the photographing target in the preview image. In order to avoid failure for determining the current composition model, the user may be prompted to slightly move the photographing device, e.g., the user may perform a translation in a certain direction or rotating following a certain direction. By performing the translation, the photographing distance and photographing angle between the photographing device and the locating device of the photographing target may be adjusted, and the position of the photographing target in the preview image may match with a certain composition model corresponding to the currently photographing scene type. Therefore, the current composition model may be determined. In particular, in one embodiment, the following method may be adopted to realize the above.

When determining the current composition model, if it is impossible to determine a matching composition model based on the currently measured photographing distance, photographing angle, position of the photographing target and the currently acquired scene image, a default composition model corresponding to the current scene type may be selected as the current composition model, and a currently suggested device adjustment manner may be determined. The user may be prompted to move the photographing device based on the device adjustment manner, and an optimized composition model may be obtained. In particular, the current scene type is obtained by recognition of the currently acquired scene image during the movement procedure. If it is detected in real time (i.e., as the photographing device is being moved) that the current composition model optimized by the adjustment (the movement of the photographing device) can be determined to correspond to a certain composition model (the matching composition model determined based on the currently measured photographing distance, photographing angle, position of the photographing target and the currently acquired scene image), the user may be prompted that it is currently possible to get photos with the current composition model.

In the above method, when it is impossible to determine the matching composition model based on the currently measured photographing distance, photographing distance and the currently acquired scene image, i.e., there is no composition model matching with the current position of photographing target in the image among the composition models corresponding to the current scene type, the user will be prompted to move the photographing device in a proper manner, so as to obtain a better photographing angle. A proper composition model may then be obtained. During the movement of the photographing device, it is required to determine, according to the real-time detected photographing distance and photographing angle between the photographing device and the locating device, whether the current position of the photographing target in the preview image matches with a certain composition model corresponding to the current photographing scene type. If the current position of the photographing target in the preview image matches with the certain composition model, it indicates that a proper composition model can be successfully determined at present. In other words, it indicates the current composition model is the proper composition model. Thus, an photo with the current composition model is available, and the user may be prompted to stop moving the photographing device and trigger the shooting of the preview image in time. Therefore, it is easier for the user to take photos with satisfactory effects.

In practical applications, those with ordinary skill in the art or the photographing user may preconfigure a default composition model corresponding to each scene type according to a practical photographing requirement.

In some embodiments, a suggested device adjustment manner may be determined as follows.

A first target candidate position which is closest to the current position of the photographing target in the preview image may be selected, from a target candidate position set matching with the currently acquired scene image. The target candidate position set includes all preconfigured target candidate positions matching with a designated scene type. The designated scene type indicates a scene type matching with the currently acquired scene image. According to the designated scene type, the device adjustment manner is determined by taking the first target candidate position as a target position of the photographing target in the preview image.

In the above method, through selecting the target candidate position closest to the current position of the photographing target in the preview image as the adjusted target position, it is possible to obtain the matching composition model with the minimum movement of the photographing device.

In particular, the device adjustment manner may include information such as: adjustment direction, movement type (e.g., translation (straight movement) or lateral rotation or longitudinal rotation, etc.) and/or movement amplitude.

Figure 5:
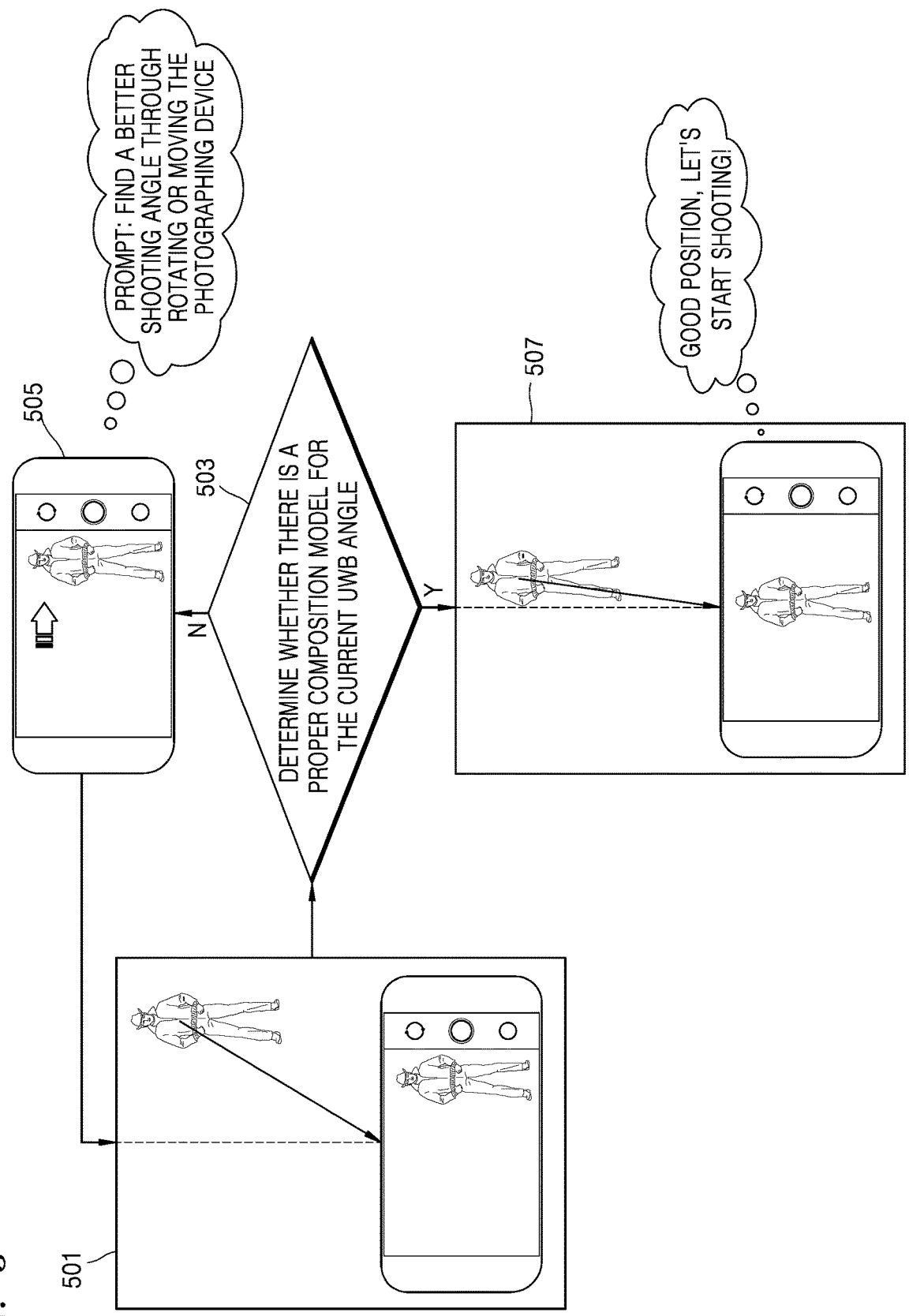
FIG. 5 is a schematic diagram illustrating a procedure of notifying the user to move the photographing device according to some embodiments.

FIG. 5 is a schematic diagram illustrating a procedure of notifying the user to move the photographing device according to some embodiments.

As shown in view 501 of FIG. 5, when the photographing target is at the edge of the preview image it may be impossible to find the matching composition model. In operation 503 it is determined whether there is a proper (i.e., matching) composition model for the current UWB angle. As shown in view 505, when the matching composition model is not found, the user may be prompted by an arrow icon and/or text information to move the photographing device. As shown in view 507, when the photographing device is moved to a proper position, the user is prompted to shoot.

In operation 103, a current photographing parameter is determined based on the set of user-preferred photographing parameters and the photographing distance, wherein the photographing parameter includes a focal length.

In this operation, a photographing parameter (or set of photographing parameters) matched with the photographing distance is selected from the set of user-preferred photographing parameters, as the current photographing parameter. For example, the set of photographing parameters may include settings for focal length, aperture, shutter and light sensitivity. As such, by setting the photographing parameters based on the currently acquired set of user-preferred photographing parameters and the photographing distance, in one aspect, the operations required for manual setting of the photographing parameters can be reduced to improve the intelligence and convenience in setting the photographing parameters, and in another aspect, the limitation from the fixed setting of the system can be broken, thereby improving the flexibility and accuracy in setting the photographing parameters.

In operation 104, a preview image is generated and displayed based on the photographing parameter and the composition model.

In an implementation, to improve the quality of the preview image, whether the current composition is reasonable may be automatically determined in this operation based on the scale of the photographing target in the image when the preview image is generated. If the current composition is unreasonable (for example, the photographing target is oversize or undersize in the image), the preview image may be optimized by changing the focal length to improve the preview image. By changing the focal length, the scale of the image and the size of the photographing target may be adjusted. Specifically, the preview image may be generated by the following operations.

In operation d1, a first image is generated based on the photographing parameter and the composition model.

In operation d2, whether a scale of the photographing target in the first image is within a preset scale range is determined. If the scale is outside the preset scale range, the focal length in the photographing parameter is adjusted so that the scale of the photographing target in the image to be within the scale range.

For example, the scale range of the photographing target in the image may be set by a user or a person skilled in the art as actually needed.

In operation d3, a second image obtained through the adjustment, i.e. scaling process, is taken as the preview image.

In the above operations d1~d3, through the preset scale range, the scale of the photographing target in the preview image may be controlled, to optimize the proportion of the photographing target in the image to not be too small or too large. Thus, on one hand, the displaying effect of the preview image may be improved. On the other hand, many inconveniences caused by manual adjustment of the focal length performed by the user for obtaining a photographing target with a proper scale can be avoided.

For example, when taking a video, mobile objects (e.g., people) in the video may move all the time, thus, the size of a person may change with the distance between the photographing user and the person being photographed. For example, when taking a video of an athlete moving along a trajectory, the camera always focuses on the athlete. When the photographed athlete is far away from the photographing device, the proportion of the athlete in the image reduces. For example, if the distance is large, the size of the athlete may be rather small. As the athlete moves towards the photographing device, the proportion of the athlete in the image increases. If the distance is small, the athlete may occupy the whole image and it may not be possible to display a complete image (entire body) of the athlete. With respect to the above, the photographing user needs to consecutively move or adjust the focal length in accordance with the movement of the photographed person, to obtain a satisfactory work with proper proportion of the photographing target. However, during the video capturing procedure, adjusting focal length may lead to problems such as preview image lagging, jerky movements, time-consuming, etc.

Through the above method, it is possible to automatically adjust the focal length based on the preset scale range, thus the photographing user can capture an image with proper size of the photographing target without manually adjusting the photographing parameter all the time.

Figure 6:
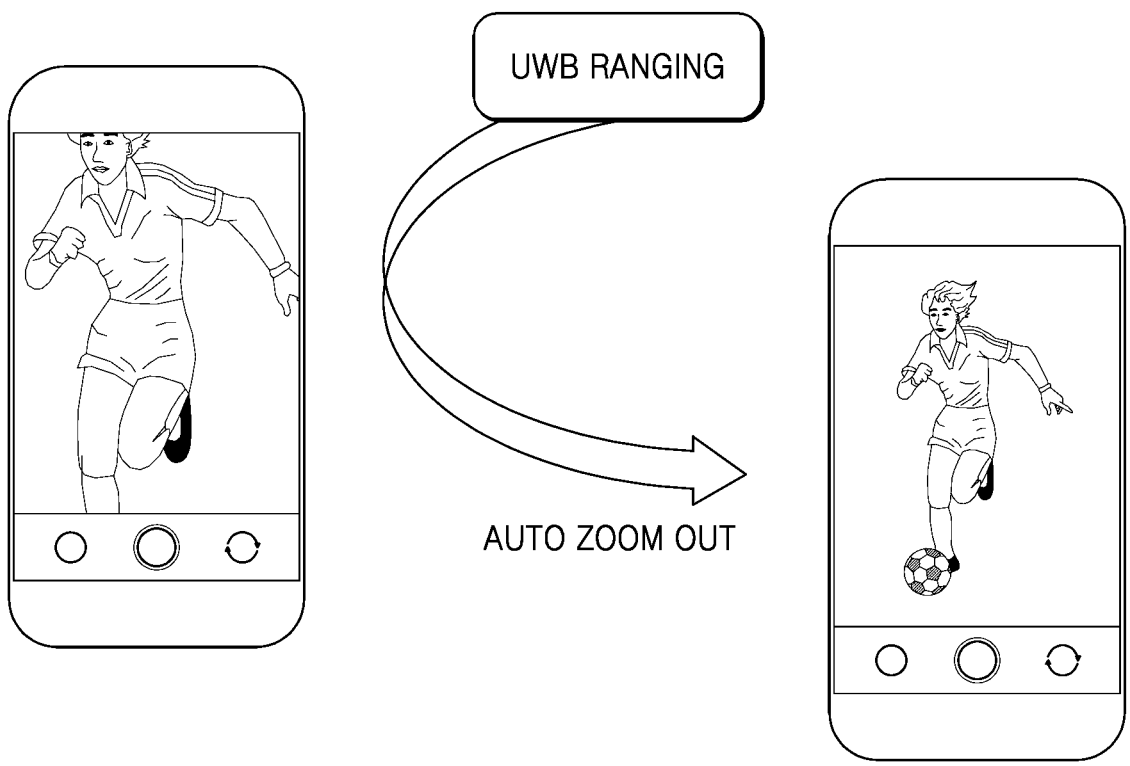
FIG. 6 is a schematic diagram illustrating an effect of zooming out during a video tracking procedure according to some embodiments.

FIG. 6 is a schematic diagram illustrating an effect of zooming out during a video tracking procedure according to some embodiments.

As shown in FIG. 6, during video tracking of the athlete moving along a trajectory, the video is automatically zoomed out so that the athlete has a proper size in the image. Therefore, incomplete display of the athlete when the athlete is close to the photographing device may be avoided (as shown in the left portion of FIG. 6), and also avoids the athlete is displayed without the small zooming scale when the athlete is far away from the photographing device.

Figure 7:
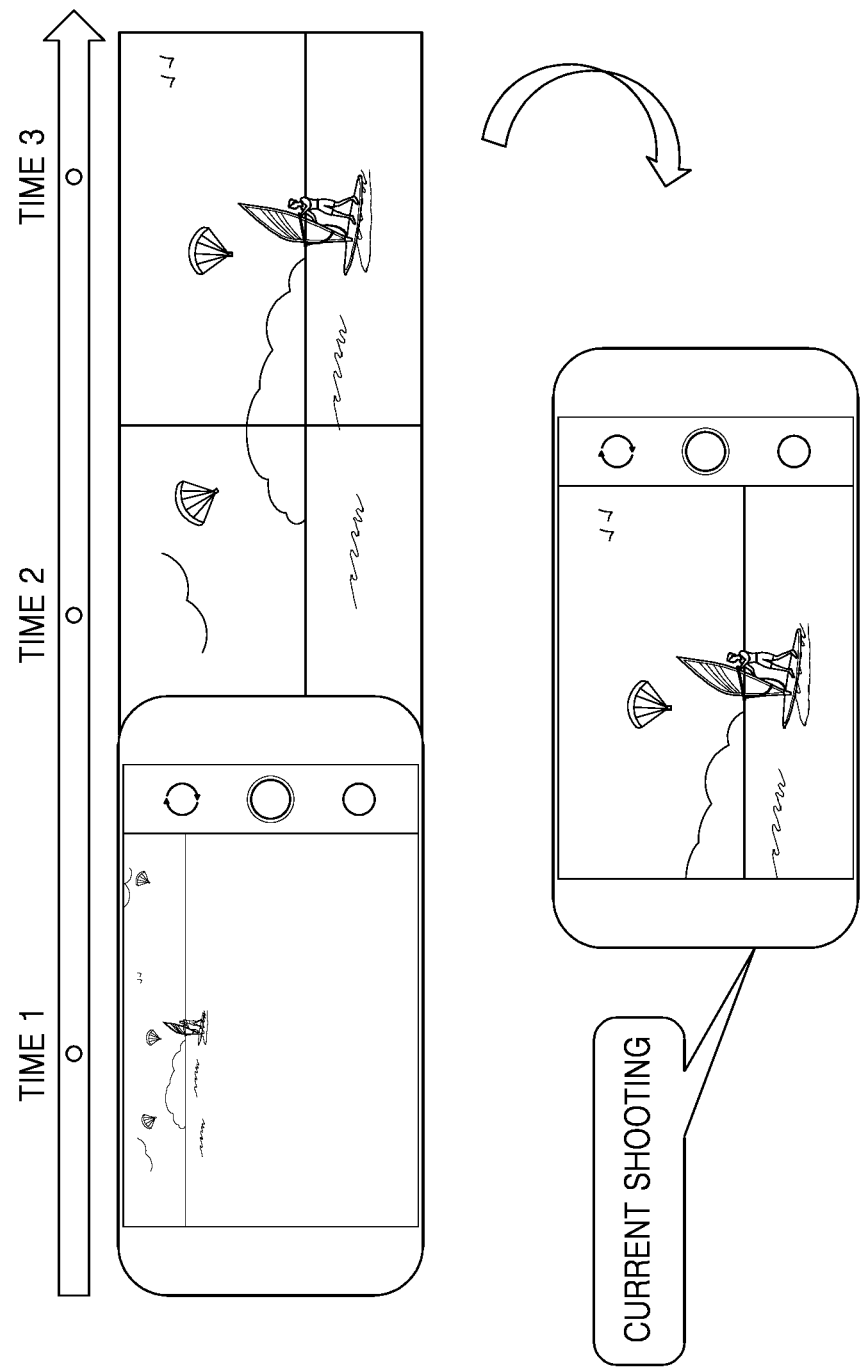
FIG. 7 is a schematic diagram illustrating an effect of automatic zooming in according to some embodiments.

FIG. 7 is a schematic diagram illustrating an effect of automatic zooming in according to some embodiments.

As shown in FIG. 7, when the photographing target may be relatively distant from the photographing device, the photographing target is very small in the image, as shown in the upper left portion of FIG. 7. Using the above method, it is possible to automatically increase the focal length to zoom in the photographing target in the image, without manual adjustment of the photographing parameter (i.e., focal length). As such, a preview image with more details of the photographing target can be displayed rapidly, and therefore the photographing device is able to be quickly optimized in order to take satisfactory images.

In practical applications, those with ordinary skill in the art may configure the scale range according to a practical requirement on the photographing target.

In operation 105, when a photographing instruction is received, the preview image is output as a photographing result (i.e., a captured photograph or video), and the set of user-preferred photographing parameters is updated by using the photographing parameter set when the photographing instruction is received.

Further, after the preview image is generated in operation 104, the user may optimize the preview image by adjusting (i.e., manually adjusting through a user interface) the photographing parameters according to the image effect of the preview image displayed currently. Accordingly, in an implementation, the photographing device may further, when detecting that a user has updated a current photographing parameter, reconstruct and display a preview image based on the updated photographing parameter and the current composition model.

Further, considering that a better shooting chance in a practical shooting scenario may be fleeting, in order to avoid missing the best shooting time due to late shooting instruction of the user as much as possible, after finishing the generation of the preview image in operation 104, it is possible to recognize, based on a preset capturing position of the current composition model, whether a better image effect can be obtained from the current preview image. If yes, the photographing device may be triggered to automatically capture an image. For example, the automatic capture may be used to meet the user's selfie requirement and avoid regrets caused by missing the better shooting time. Thus, a better shooting experience can be obtained. In particular, the above capturing effect may be realized by the following method:

After finishing the generation of the preview image, it may be determined whether the position of the photographing target in the preview image is a preset capturing position of the current composition model. If yes, the current preview image is captured without the user instruction, and the current preview image may be output as a capturing result.

When it is detected that the photographing target is located on the preset capturing position of the current composition model, it indicates that it meets the preset capturing parameters. Once the preset capturing parameters are met, the shooting of the current preview image is triggered.

As to the preset capturing position of the composition model, in practical applications, those with ordinary skill in the art or the user may select, with respect to each composition model, a position of the photographing target capable of obtaining a better capturing effect as the capturing position according to aesthetic requirements or automatic capturing requirements of the user.

Preferably, in order to improve user experience, a capturing button may be configured in the capturing configurations, for example through a user interface. Once the user enables the capturing button, the above capturing method is performed to control the photographing device automatically capture a photo with ideal capturing angle for the user.

Figure 8:
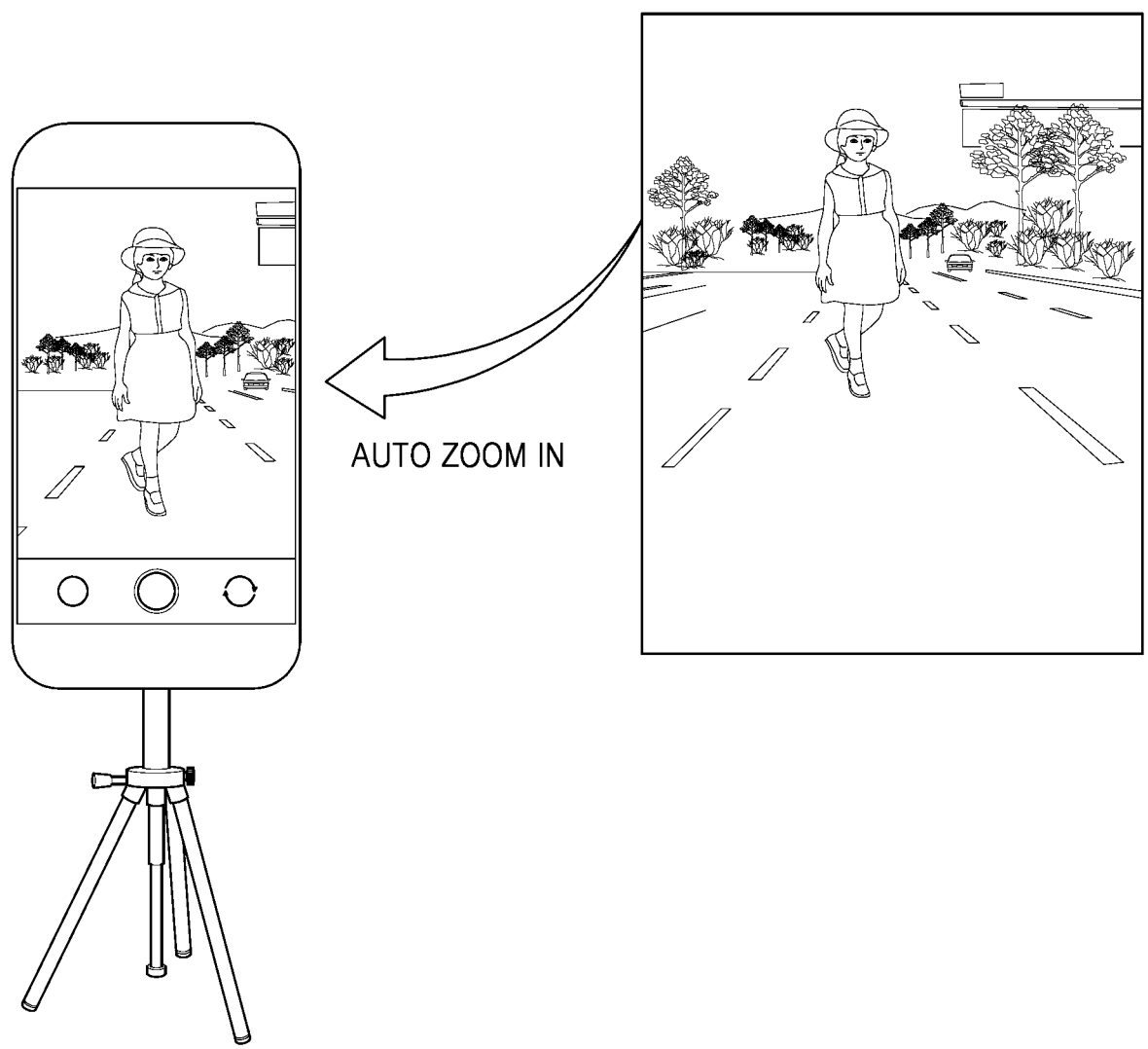
FIG. 8 is a schematic diagram illustrating a selfie according to some embodiments.

FIG. 8 is a schematic diagram illustrating a selfie according to some embodiments.

As shown in FIG. 8, when the user takes selfies using a photographing device provided on a tripod, a capturing position may be configured in the photographing device. The photographing device automatically finishes the capturing when the user enters the capturing position corresponding to the current preview image. Thus, it is possible for the photographing device to automatically capture selfies with ideal capturing angles for the user, which improves capturing convenience and intelligence.

Further, in an implementation, to improve the quality of preview image, the reconstruction of the preview image may be triggered when a change occurs. That is, when it is detected that the distance or the angle changes, operation 102 is returned to, and the preview image may be reconstructed by operations 102 to 104.

In the embodiments discussed above, the photographing device measures the photographing distance and angle with respect to the locating device using UWB ranging, determines the current composition model based on the currently measured photographing distance and angle and the currently acquired scene image, acquires the set of user-preferred photographing parameters matched with the composition model, and determines a current photographing parameter including the focal length based on the set of user-preferred photographing parameters and the photographing distance. As such, the accuracy in photographing distance can be improved by virtue of the accuracy of UWB ranging, thereby further improving the accuracy of the used composition model and the focal length for photographing. Moreover, the dependency on the manual setting of the photographing parameter by a user can be reduced by setting the photographing parameter based on the set of user-preferred photographing parameters matched with the current photographing scene and the current photographing distance. This allows for improved intelligence and convenience in setting the photographing parameters. Also, the expressive force of the preview image can be improved by using the composition model matched with the current photographing scene, thereby further improving the preview image.

Figure 9:
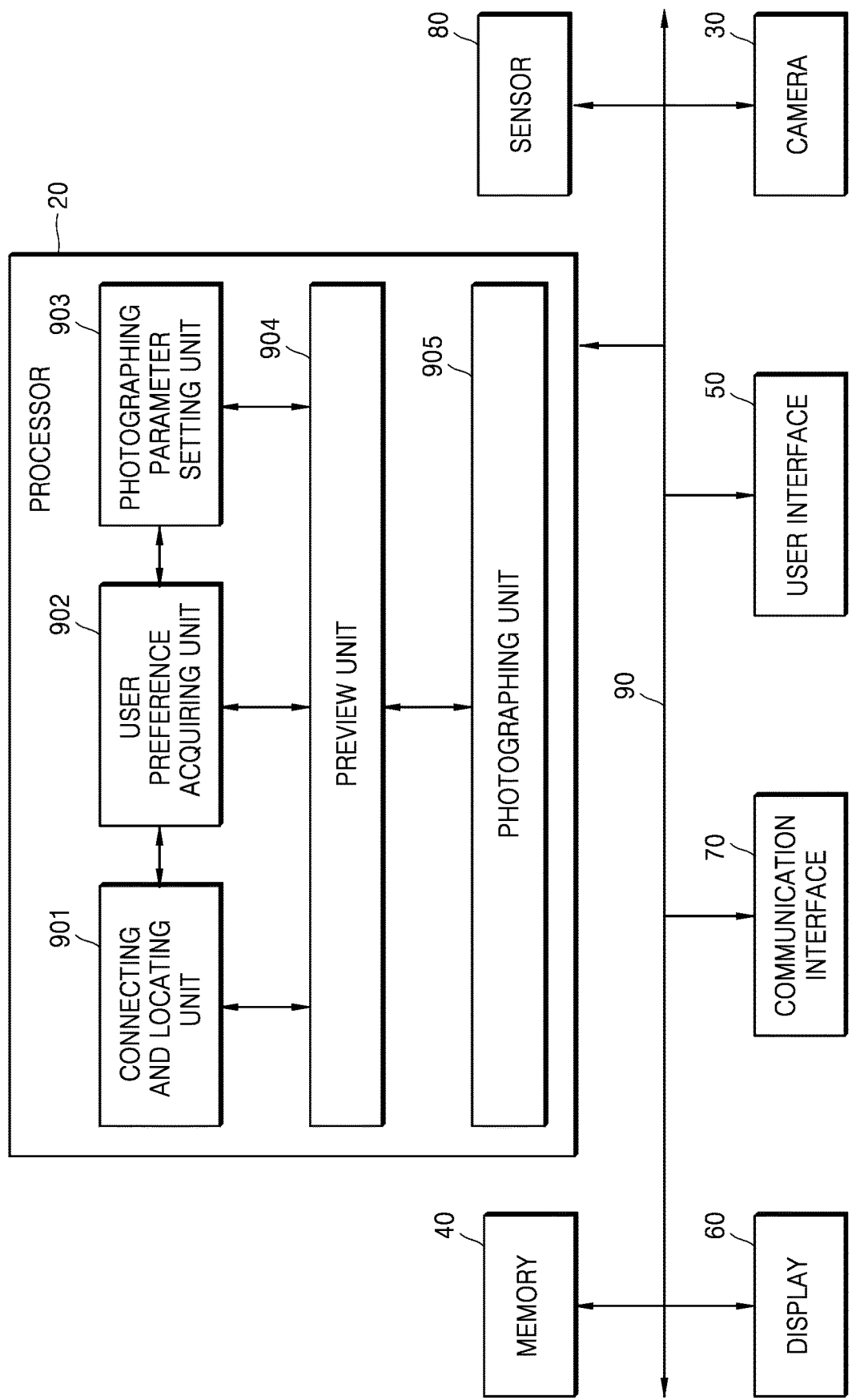
FIG. 9 is a schematic structural diagram of a photographing apparatus according to an embodiment.

FIG. 9 is a schematic structural diagram of a photographing apparatus 10 according to embodiments.

As shown in FIG. 9, the photographing apparatus 10 may include a processor 20, a camera 30 including an image signal processor 32 and an image sensor 34, a memory 40, a user interface (UI) 50, a display 60, a communication interface 70, sensor 80 and bus 90. The camera 30 may include an image sensor and an image signal processor. The memory 40 may be non-transitory. The user interface 50 may include one or more buttons and a touch interface. The touch interface may be provided with respect to (i.e., provided on) the display 60 to provide a touch screen interface. The communication interface 70 may be configured to communicate with external devices, and for example may include a UWB interface and one or more UWB chip antennas, a cellular interface, a Bluetooth interface, a wireless fidelity (Wi-Fi) interface, a Wi-Fi Direct (WFD) interface, a Bluetooth Low Energy (BLE) interface, an Infrared Data Association (IrDA) interface, a Near Field Communication (NFC) interface, a laser communication network interface, a universal serial bus (USB) interface, and Ethernet interface, an optical interface, and the like. The sensor 80 may include an accelerometer.

The processor 20 may control operation of the photographing apparatus 10. The processor 20 may include a connecting and locating unit 901 configured to, when a photographing device is in a photographing mode, control the communication interface 70 to establish an UWB connection with a locating device carried by a photographing target, and measure a photographing distance and angle with respect to the locating device in real time in an UWB ranging manner.

The processor 20 may include a user preference acquiring unit 902 configured to determine a current composition model based on the currently measured photographing distance and angle and a currently acquired scene image, and acquire a set of user-preferred photographing parameters that are matched with the composition model.

The processor 20 may include a photographing parameter setting unit 903 configured to determine a current photographing parameter based on the set of user-preferred photographing parameters and the photographing distance. The photographing parameter includes a focal length.

The processor 20 may include a preview unit 904 configured to generate and control the display 60 to display a preview image based on the photographing parameter and the composition model.

The processor 20 may include a photographing unit 905 configured to, when a photographing instruction is received, output the preview image as a photographing result, and update the set of user-preferred photographing parameters based on the photographing parameter set when the photographing instruction is received.

The memory 40 stores at least one application to be executed by the processor 20, so that the processor 20 controls the photographing apparatus 10 to perform the operations described above.

The memory 40 may be specifically embodied as a variety of storage media such as an electrically-erasable programmable read-only memory (EEPROM), a flash memory, and a programmable read-only memory (PROM). The processor 20 may be embodied as including one or more central processors, or one or more field programmable gate arrays, in which one or more central processor cores are integrated. For example, the processor 20 may be a central processing unit (CPU), a graphics processing unit (GPU), an accelerated processing unit (APU), a microprocessor, a microcontroller (MCU), a digital signal processor (DSP), a field-programmable gate array (FPGA), an application-specific integrated circuit (ASIC), and the like.

It should be noted that not all the operations and modules in the processes and structural diagrams as described above are necessary, and some of these operations or modules may be ignored according to actual needs. The order for executing the operations is not fixed and may be adjusted as needed. The division of respective modules is merely for the convenience in describing the division of the used functions. During actual implementation, one module may be implemented by a plurality of modules respectively, the functions of a plurality of modules may be implemented by the same module, and these modules may be located either in the same device or in different devices.

The modules may be hardware modules may be implemented mechanically or electronically. For example, one hardware module may include a specially designed permanent circuit or logic device (for example, a dedicated processor, such as FPGA or ASIC) for completing a specific operation. The hardware module may also include a programmable logic device or circuit (for example, including a general-purpose processor or other programmable processors) configured temporarily by software for executing a specific operation. Whether a mechanical manner, a dedicated permanent circuit, or a temporarily configured circuit (for example configured by software for implementing the hardware module) is adopted depends on cost and time.

The memory 40 may include a machine-readable storage medium for storing at least one instruction that allows a machine to execute the method as described in the present application. Specifically, a system or apparatus provided with a storage medium may be provided, wherein the storage medium stores therein at least one software program code for implementing the function of any one implementation in described above; and a computer (or CPU or MPU) of the system or apparatus is allowed to read and execute the program code stored in the storage medium. In addition, an operating system operated on the computer may also complete part or all of the actual operation through an instruction based on the program code. The program code read from the storage medium may be also written into a memory provided in an expansion board inserted in the computer, or into a memory provided in an expansion unit connected to the computer, and subsequently, a CPU installed on the expansion board or unit is allowed to execute part or all of the actual operation through the instruction based on the program code, thereby fulfilling the function of any one of implementations in the above-mentioned embodiment.

The storage medium for providing the program code may be implemented as a floppy disk, a hard disk, a magneto-optical disk, an optical disk (such as CD-ROM, CD-R, CD-RW, DVD-ROM, DVD-RAM, DVD-RW and DVD+RW), a magnetic tape, a non-volatile memory card and an ROM. Alternatively, the program code may be downloaded from a server computer or cloud over a communication network.

As used herein, "schematic" means "serving as an instance, example or explanation", and any illustration, implementation described as "schematic" herein should not be construed as a more preferred or advantageous technical solution. For the conciseness of drawings, each diagram schematically shows portions relevant to the description, and does not necessarily represent the actual structure as a product. In addition, for the conciseness of the drawings and the convenience in understanding, only one of components having the same structure or function is schematically depicted or marked in these drawings. As used herein, "one" does not mean that the number of relevant parts is restricted to "only one", and does not mean to exclude the situation where the number of relevant parts is "more than one". As used herein, "upper", "lower", "front", "back", "left", "right", "inside", "outside" and the like are merely used to indicate a relative positional relationship between relevant parts, rather than limiting the absolute positions of these relevant parts.

While aspects of embodiments have been particularly shown and described, it will be understood that various changes in form and details may be made therein without departing from the spirit and scope of the following claims.

The invention claimed is:

1. A method performed by an electronic device capturing an image or a video, the method comprising:
   establishing a communication connection with an external device associated with a target;
   identifying a photographing distance and a photographing angle with respect to the external device, both of which are directly calculated based on timings of ultra-wideband ranging signals transmitted and received through the communication connection;
   acquiring a scene image based on an output of the electronic device;
   identifying a current composition model based on the photographing distance, the photographing angle and the scene image;
   acquiring a set of photographing parameters that are associated with the current composition model;
   identifying a photographing parameter based on the set of photographing parameters and the photographing distance, wherein the photographing parameter comprises a focal length;
   generating and displaying a preview image based on the output of the electronic device, the photographing parameter and the current composition model;
   outputting the preview image as a photographing result based on a photographing instruction; and
   updating the set of photographing parameters based on the photographing parameter.

2. The method according to claim 1, wherein the identifying the photographing distance and the photographing angle comprises:
   identifying a first distance between a first antenna of the electronic device and the external device;
   identifying a second distance between a second antenna of the electronic device and the external device;
   identifying a third distance between a third antenna of the electronic device and the external device;
   determining coordinates P of the external device in a three-dimensional coordinate system based on first coordinates of the first antenna, second coordinates of the second antenna, third coordinates of the third antenna, the first distance, the second distance and the third distance, wherein an origin of the three-dimensional coordinate system is a circumcenter of a polygon, and vertexes of the polygon correspond to the first antenna, the second antenna and the third antenna;
   identifying an angle of a connecting line between the origin and the coordinates P with respect to a plane in which the polygon exists, to obtain the photographing angle; and
   identifying the photographing distance based on a distance d between the origin and the coordinates P.

3. The method according to claim 2, wherein the identifying the photographing distance comprises identifying the photographing distance D according to D=Δd+d, and
   wherein Δd represents a displacement of the electronic device from an initial position, Δd is less than 0 when the displacement is a forward displacement and is greater than 0 when the displacement is a backward displacement.

4. The method according to claim 2, wherein the identifying the photographing distance comprises:
identifying the electronic device is currently displaced forward or backward from an initial position;
identifying the distance d as the photographing distance D based on identifying the electronic device is not currently displaced forward or backward;
identifying whether a user-preferred photographing displacement is currently saved;
identifying the photographing distance D according to D=Δd'+d, with Δd' representing the user-preferred photographing displacement based on the user-preferred photographing displacement being currently saved;
identifying the photographing distance D according to D=Δd+d, wherein Δd represents a displacement of the electronic device from the initial position; and
saving the Δd as the user-preferred photographing displacement Δd', and
wherein Δd is less than 0 when the displacement is a forward displacement and is greater than 0 when the displacement is a backward displacement.

5. The method according to claim 1, wherein the identifying the photographing distance and the photographing angle comprises:
identifying a mean distance and a mean angle based on a plurality of distances d and a plurality of angles α between the electronic device and the external device, which are currently measured for N times;
identifying the mean distance as the photographing distance and the mean angle as the photographing angle based on an absolute value of a difference between each of the plurality of distances d and the mean distance being less than a preset distance threshold T; and
repeating the identifying the mean distance and the mean angle based on the absolute value of the difference between any of the plurality of distances d and the mean distance being greater than or equal to the preset distance threshold T, and
wherein measuring the plurality of distances d and the plurality of angles α comprises:
identifying a first distance between a first antenna of the electronic device and the external device;
identifying a second distance between a second antenna of the electronic device and the external device;
identifying a third distance between a third antenna of the electronic device and the external device;
determining coordinates P of the external device in a three-dimensional coordinate system based on first coordinates of the first antenna, second coordinates of the second antenna, third coordinates of the third antenna, the first distance, the second distance and the third distance, wherein an origin of the three-dimensional coordinate system is a circumcenter of a polygon, and vertexes of the polygon correspond to the first antenna, the second antenna and the third antenna;
identifying an angle of a connecting line between the origin and the coordinates P with respect to a plane in which the polygon exists, to obtain each of the angles α; and
identifying each of the distances d based on coordinates corresponding to the origin and the coordinates P.

6. The method according to claim 1, wherein the identifying the current composition model comprises:
identifying a position of the photographing target in the preview image based on the photographing distance and the photographing angle;
identifying a scene type based on the scene image; and
identifying a composition model that corresponds to the position and the scene type as the current composition model.

7. The method according to claim 6, further comprising:
after generating the preview image, determining whether the position of the photographing target in the preview image corresponds to a target capturing position of the current composition model; and
outputting the preview image as the photographing result based on the position of the photographing target in the preview image corresponding to the target capturing position.

8. The method according to claim 1, wherein the identifying the current composition model comprises selecting a default composition model corresponding to the scene image, and
wherein the method further comprises:
identifying a device adjustment;
outputting a notification to move the electronic device based on the device adjustment; and
providing a notification when it is possible to obtain photos with the current composition model during a movement procedure when the current composition model match with the default composition model.

9. The method according to claim 8, wherein the identifying the device adjustment comprises:
selecting, from a target candidate position set matching the scene image, a first target candidate position based on a position of the photographing target in the preview image, wherein the target candidate position set comprises a plurality of target candidate positions matching a scene type corresponding to the scene image; and
identifying the device adjustment by identifying the first target candidate position as a target position of the photographing target in the preview image.

10. The method according to claim 1, further comprising:
identifying a user-set photographing parameter based on the acquiring the set of photographing parameters failing; and
adding the user-set photographing parameter to the set of photographing parameters associated with the current composition model.

11. The method according to claim 1, wherein the generating the preview image comprises:
generating a first image based on the photographing parameter and the current composition model;
identifying whether a scale of the photographing target in the first image is within a preset scale range;
based on the scale of the photographing target not being within the preset scale range, adjusting the focal length in the photographing parameter in order to make the scale of the photographing target be within the preset scale range; and
identifying a second image obtained based on the adjusted focal length as the preview image.

12. The method according to claim 1, further comprising:
identifying an updated photographing parameter; and
generating and displaying an updated preview image based on the updated photographing parameter and the current composition model.

13. The method according to claim 1, further comprising:
identifying that the photographing distance or the photographing angle changes to an updated photographing distance or an updated photographing angle;
identifying an updated composition model based on the updated photographing distance and the updated photographing angle and the scene image;
acquiring an updated set of user-preferred photographing parameters matched with the updated composition model;
identifying an updated photographing parameter based on the updated set of user-preferred photographing parameters and the photographing distance; and
generating and displaying an updated preview image based on the updated photographing parameter and the updated composition model.

14. An electronic device comprising:
a communication interface;
a camera;
a display;
a memory; and
a processor configured to:
establish a communication connection with an external device associated with a photographing target using the communication interface;
identify a photographing distance and a photographing angle with respect to the external device, both of which are directly calculated based on timings of ultra-wideband ranging signals transmitted and received through the communication interface;
acquire a scene image based on an output of the camera;
identify a current composition model based on the photographing distance, the photographing angle and the scene image;
acquire a set of photographing parameters that are associated with the current composition model;
identify a photographing parameter based on the set of photographing parameters and the photographing distance, wherein the photographing parameter comprises a focal length;
control the display to display a preview image based on the output of the camera, the photographing parameter and the current composition model;
output the preview image as a photographing result based on a photographing instruction; and
update the set of photographing parameters based on the photographing parameter.

15. The electronic device of claim 14, wherein the processor is further configured to:
control the communication interface to transmit a request signal to the external device and receive a response signal from the external device; and
identify the photographing distance based on a transmission time corresponding to transmission of the request signal and a reception time corresponding to reception of the response signal.

16. The electronic device of claim 14, wherein the communication interface comprises a first antenna, a second antenna and a third antenna, and
wherein the processor is further configured to:
control the communication interface to transmit a first request signal to the external device through the first antenna at a first transmission time, receive a first response signal from the external device through the first antenna at a first reception time, transmit a second request signal to the external device through the second antenna at a second transmission time, receive a second response signal from the external device through the second antenna at a second reception time, transmit a third request signal to the external device through the third antenna at a third transmission time, and receive a third response signal from the external device through the third antenna at a third reception time; and
identify the photographing distance and the photographing angle based on the first transmission time, the first reception time, the second transmission time, the second reception time, the third transmission time and the third reception time.

17. The electronic device of claim 14, wherein the processor is further configured to:
identify a position of the photographing target in the preview image based on the photographing distance and the photographing angle;
identify a scene type based on the scene image; and
identify a composition model that corresponds to the position and the scene type as the current composition model.

18. The electronic device of claim 14, wherein the processor is further configured to: select a default composition model corresponding to the scene image;
identify a device adjustment;
output a notification to move the electronic device based on the device adjustment; and
provide a notification when it is possible to obtain photos with the current composition model during a movement procedure when the current composition model match with the default composition model.

19. The electronic device of claim 14, wherein the processor is further configured to:
generate a first image based on the photographing parameter and the current composition model;
identify whether a scale of the photographing target in the first image is within a preset scale range;
based on the scale of the photographing target not being within the preset scale range, adjust the focal length in the photographing parameter in order to make the scale of the photographing target be within the preset scale range; and
identify a second image obtained based on the adjusted focal length as the preview image.

20. A non-transitory computer-readable storage medium storing instructions that, when executed by a processor, cause the processor to control an electronic device to perform a photographing method comprising:
establishing a communication connection with an external device associated with a photographing target;
identifying a photographing distance and a photographing angle with respect to the external device, both of which are directly calculated based on timings of ultra-wideband ranging signals transmitted and received through the communication connection;
acquiring a scene image based on an output of a camera of the electronic device;
identifying a current composition model based on the photographing distance, the photographing angle and the scene image;
acquiring a set of photographing parameters that are associated with the current composition model;
identifying a photographing parameter based on the set of photographing parameters and the photographing distance, wherein the photographing parameter comprises a focal length;

generating and displaying a preview image based on the output of the camera, the photographing parameter and the current composition model;

outputting the preview image as a photographing result based on a photographing instruction; and updating the set of photographing parameters based on the photographing parameter.

* * * * *